UNITED STATES PATENT OFFICE.

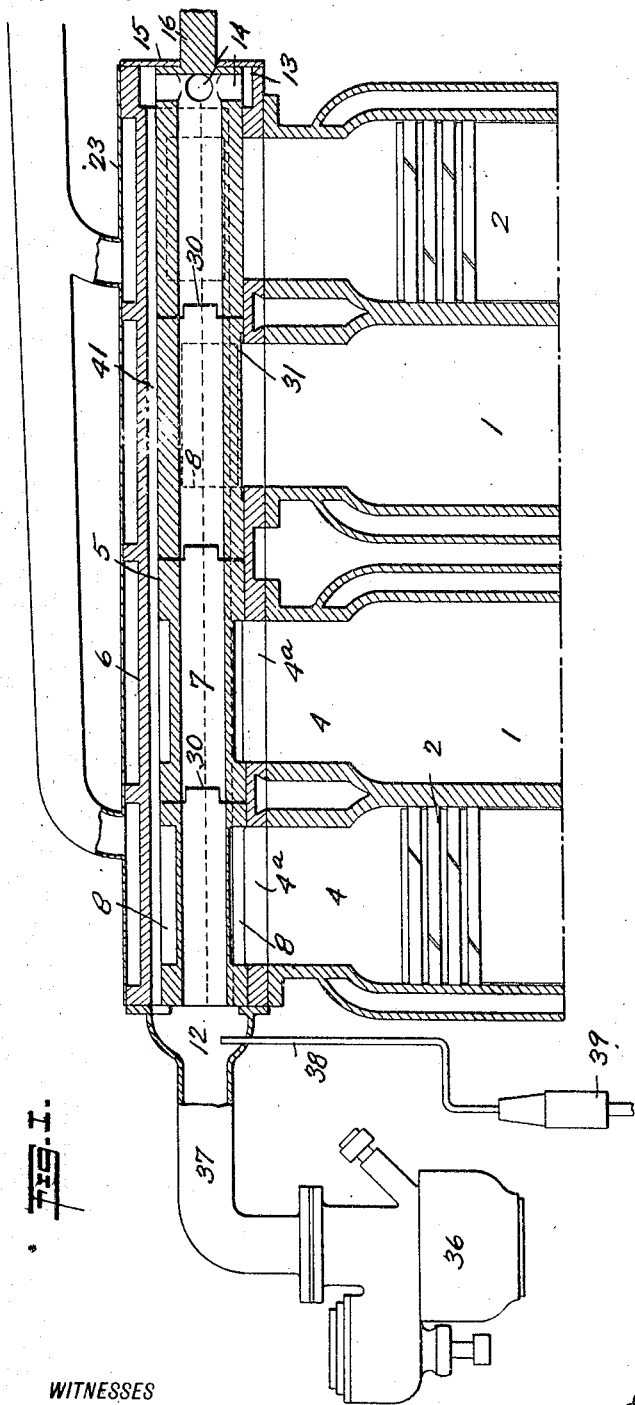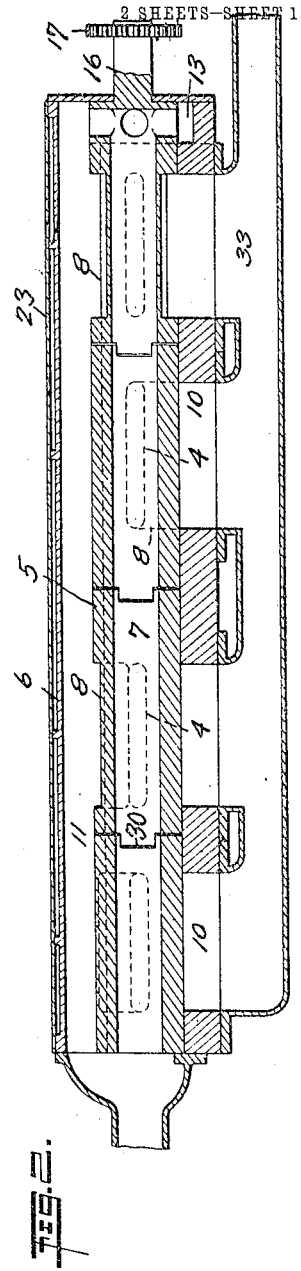

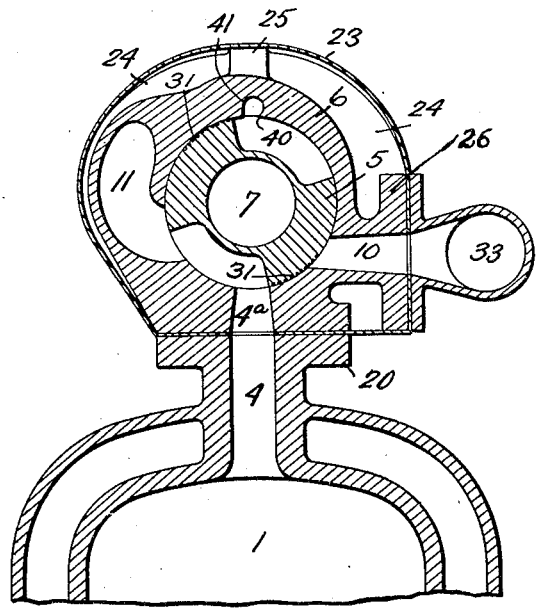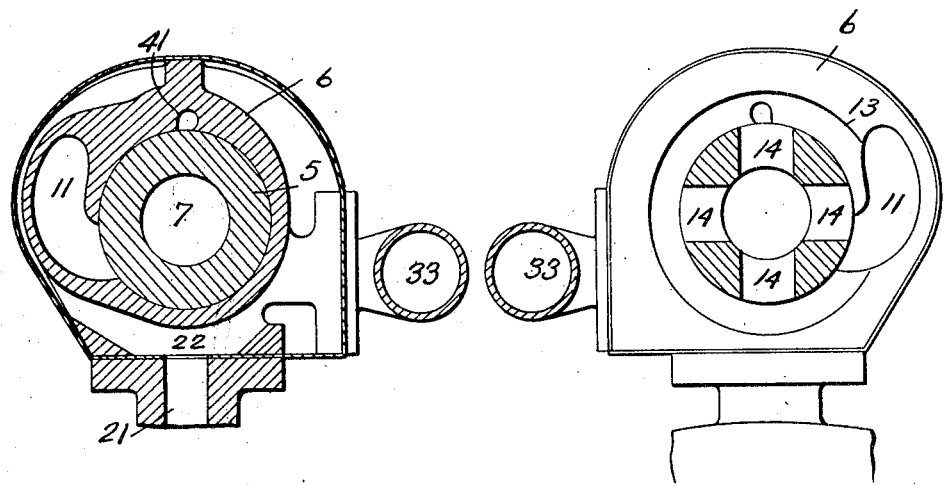

EUGENE M. BOURNONVILLE, OF JERSEY CITY, NEW JERSEY.

INTERNAL-COMBUSTION ENGINE.

1,118,730.                     Specification of Letters Patent.      Patented Nov. 24, 1914.

Application filed July 1, 1914. Serial No. 848,351.

*To all whom it may concern:*

Be it known that I, EUGENE M. BOURNONVILLE, a citizen of the United States, and a resident of Jersey City, in the county of Hudson and State of New Jersey, have invented certain new and useful Improvements in Internal-Combustion Engines, of which the following is a specification.

The object of my invention is to provide a simple and efficient rotary valve for internal combustion engines.

More particularly stated, my object has been to produce a construction which provides for effective and advantageous cooling of the valve, permits of low surface speed, guards against warping and binding, insures adequate and advantageous lubrication of the surfaces of the valve and valve casing, and avoids accumulation of carbon thereon. The valve structure illustrated herein resembles in its main features that disclosed in my co-pending application, filed February 11, 1914, Serial No. 817,990, and the broad claims generic to both cases are contained herein. Both cases embody means in the casing of a rotary cylindrical valve for multicylinder engines whereby fuel gases containing a percentage of lubricant are conducted in contact with the surface of the valve throughout its length, and are concerned more especially with a construction wherein the valve is cooled by fresh gases flowing through its interior and thence admitted to an intake manifold, the valve having external pockets in its sides which alternately connect a single port in each cylinder with the intake manifold and with the exhaust. In the particular construction shown and claimed in application Serial No. 817,990 aforesaid, the intake manifold communicates with the cylindrical valve chamber by separate ports, and a special lubricating channel is provided for conducting the gases throughout the length of the surface of the valve.

In the construction shown herein and claimed in specific claims appended hereto the intake manifold itself is in open communication with the surface of the valve throughout its length and performs the lubricating function.

The present case also covers certain features, some of which are disclosed but not claimed in the other case, claims therefor being reserved for this application, relating to the automatic supply of the lubricant in such manner as to be aspirated by the current of fresh gases drawn by the pistons on their suction strokes, the division of the valve into separate, interengaging sections, one for each cylinder, whereby binding from warping is prevented, provisions for removing any carbon which may collect on the surfaces of the valve and casing, the formation of the lateral pockets in the thickness of the walls of the valve so as to avoid overheating or warping from excessive local heating, and the admission of the fuel gases to both ends of the intake manifold so as to equalize as to temperature and quantity the charges drawn into the several cylinders. Other features will be apparent to those skilled in the art.

In the accompanying drawings: Figure 1 is a vertical longitudinal section through the engine and valve, a carbureter and a forced feed lubricant supply being represented schematically in elevation; Fig. 2 is a horizontal section through the valve and casing; Fig. 3 is a cross-section through the valve and casing and the upper portion of one of the cylinders, the plane of the section intersecting a pair of the pockets in the side of the valve; Fig. 4 is a cross-sectional view taken through the valve and casing intermediate two of the cylinders and showing the water cooling passages; and Fig. 5 is a cross-section taken through the chamber shown at the right-hand end of the valve in Figs. 1 and 2.

The engine comprises a plurality of cylinders 1, containing reciprocating pistons 2 connected in the usual manner to a crank shaft. In the head of each cylinder is a single port 4, which serves both for intake and exhaust. These ports are of slot-like character, being elongated lengthwise of the series of cylinders and narrow in the transverse direction.

The valve 5 is disposed lengthwise over the heads of the cylinders, rotating within a suitable casing 6. This casing is provided in the bottom with ports 4ᵃ of the same dimensions as the ports 4, with which they register, the ports 4 and 4ᵃ together constituting a single passage or cylinder port for each cylinder. In addition, the casing has an intake manifold 11 at one side and exhaust ports 10 at the other side, leading to an exhaust manifold 33. The valve is hollow, being formed with a central longitudinal passage or bore 7, which extends substantially throughout its length; and it is also provided with lateral pockets 8, preferably of substantially the same length as the cylinder ports and of suitable width circumferentially of the valve, their function being to connect the cylinder ports alternately with the intake and exhaust spaces of the casing. These pockets are formed in the thickness of the walls of the valve, as in this manner the heat from the pockets is quickly conducted into the surrounding metal of the walls, thereby avoiding overheating and in particular excessive local heating with consequent danger of distortion.

As a further prevention against distortion of the valve and in order to compensate for any distortion therein or in the casing, the valve is made in separate sections, one for each engine cylinder, the abutting ends of the sections having interengaging toothed formations 30, which cause the sections to turn together as one somewhat flexible construction. These joints afford a slight amount of play, so that the sections can move to a limited extent angularly or laterally with reference to each, so as to permit of independent expansion of the portion of the valve over each cylinder and prevent binding from buckling or warping, which has hitherto proved a serious difficulty in rotary valve construction for internal combustion engines.

The internal passage 7 in the valve has means of communication with a suitable source of fuel gases, such as a carbureter 36; and at a remote point is in communication with the manifold chamber 11. The latter is formed by a lateral enlargement or extension of the wall of the valve casing, and is in open communication with the surface of the valve throughout the length of the latter.

A pipe 37 and fitting 12 is shown connecting the carbureter with the open end of the valve casing, the adjacent ends of both the passage 7 and the manifold 11 being wide open to the interior of this fitting. At the opposite end of the valve, communication between said passage 7 and the manifold chamber is afforded by a chamber 13, which is formed by enlarging the internal dimensions of the casing at this point, to receive the fresh gases emerging from openings 14 formed through the walls of the valve. From this chamber the gases flow into the other full-open end of the manifold chamber. The latter thus receives its fresh gases from both ends, a fact which is important since it has the effect of equalizing the charges drawn into the several cylinders, both as to temperature and quantity. The cross-sectional area of the bore of the valve and of the inlets to the intake manifold are preferably approximately equal, though this may be varied, and the areas of the bore and manifold together are preferably somewhat greater than the area of the cylinder port.

The outer end of the chamber 13 is closed by an apertured plate 15, through which projects a shaft 16 suitably secured to the end of the valve. This shaft bears a gear or sprocket 17, by which the valve is driven in proper time with the crank shaft. The valve finds its bearing in the interior of the casing 6, but it will be understood that special bearings may be provided, if, and where, desired.

Suitable provisions are made for waterjacketing the valve casing. As shown, the casing is seated on flanges 20 formed on the heads of the engine cylinders, and these flanges have, in addition to the ports 4, openings 21 communicating with the engine water-jackets. The base of the valve casing is provided with registering openings 22, which are branched as shown in Fig. 4, so as to open through opposite sides of the casing. The water thus permitted to flow around the valve casing is confined by a sheet metal jacket 23, which is spaced from the outside of the casing by suitable ribs 24 and posts 25. This jacket is preferably extended entirely around the casing, with its lateral portions brought beneath the base thereof so as to be clamped between this base and the cylinder flanges 20. Suitable openings are formed in the sheet metal at the regions of the ports 4ª and 10 and the openings 21, 22. As shown, the jacket space is greater at the side of the casing having the exhaust ports 10 and the flange 26, to which the exhaust manifold 33 is secured. The ribs 24 extend around both sides of the valve casing and reinforce the same against expansion strains.

In the best embodiment of my invention there are two of the pockets 8 for each of the engine cylinders, each of these pockets serving alternately for intake and exhaust. The valve is thus rotated at one-quarter the speed of the crank shaft. By suitably proportioning the ports and pockets, the intake and exhaust can be caused to open and close at any degree before or after dead center desired. Large and easy passages are afforded for the flow of the gases, full opening of both the intake and exhaust is obtained promptly, and each cut-away portion of the valve is subjected to the heat of the exhaust only once in four revolutions of the crank shaft. At the same time the valve is kept cool by the constant passage of fresh gases through its interior.

Lubrication is provided by introducing a suitable amount of lubricant into the fuel, so that the manifold 11, extending throughout the length of the casing and constantly filled with fresh gases traveling in contact with the surface of the valve, affords adequate lubrication to the surfaces of the valve and casing. The lubricant condensed and here deposited prevents sticking or burning and also opposes leakage around the valve. Automatic supply of the lubricant to the fuel is secured in a simple manner and in accordance with the needs of the engine by leading a pipe or nozzle 38 into the fresh gas duct intermediate the carbureter and valve, this nozzle terminating in a fine orifice which is in aspirating relation to the current of gases drawn by the pistons of the engine and being supplied by a forced feed boiler, represented diagrammatically at 39, which is driven by the engine and pumps oil at a rate dependent upon the speed thereof. For successful operation the oil to be thus vaporized by the current of fresh gases requires to be quite thin.

At the sides of the pockets the surface of the valve is formed with ribbed areas 31, which are produced by making small parallel longitudinal channels, say of a width and depth of about a thirty-second of an inch and spaced apart about a sixteenth of an inch. These ribbed areas serve to keep the inner surface of the valve casing free from carbon, but in order not to become filled with carbon themselves they are confined to such portions of the circumference of the valve that when the explosion occurs and during the working stroke, a plain surface of the valve closes the cylinder port. During the compression strokes, however, the ribbed portions are opposite the cylinder ports, and the forcing of the fuel gases into the channels which results is an advantage because it promotes lubrication. In this connection the channels preferably extend at both ends somewhat beyond the valve pockets, so that the oil-bearing gases are forced into contact with portions of the inner surface of the casing which are not lubricated by the portions of trapped gases that are carried by the pockets from the intake ports to the exhaust ports.

In order to scrape the valve free of any carbon which may collect thereon, a small channel 41 is formed in the inner surface of the casing at the top, and provided at one side with a scraping edge 40. This channel is open at both ends to the supply fitting 12 and the chamber 13, respectively, so that a current of fresh gases flows through it, thereby tending to remove any carbon taken up by the scraping edge and also contributing to the lubrication. It will be noted that this cleaning provision is located at the top, where the valve is pressed against the casing by the force of the explosions, but the channel must not be too wide, else the bearing for the valve will be impaired.

In operation the valve turns in the direction of the arrow at one-quarter the speed of the crank shaft. Fresh gases are sucked from the carbureter throughout the length of the hollow interior of the valve, cooling the same. They thence pass in the reverse direction through the manifold chamber, to which gases are also admitted at the opposite end. The parts are so timed that one of the pockets 8 for each cylinder connects the cylinder valve with the intake manifold during the suction stroke; and during the compression and firing strokes the cylinder port is covered by one of the solid bearing surfaces between the pockets. During the exhaust stroke the other pocket connects the cylinder port with the exhaust, and during the next stroke, which is a suction stroke, this same pocket connects the cylinder port with the intake, so that a new charge is drawn into the cylinder. During the explosion the pockets are disposed at the sides, so that the portion of the valve which transmits the thrust to the top of the casing possesses a full and unbroken bearing surface. Lubrication and cleaning of the surfaces and other features of the operation have already been fully described.

What I claim as new is:

1. In an internal combustion engine, the combination with a plurality of cylinders having ports for intake and exhaust and pistons operative in the cylinders, of a rotary valve disposed lengthwise of the series of cylinders, and a valve casing provided with means for conducting fresh fuel gases carrying a proportion of lubricant in contact with the surface of the valve throughout the length thereof.

2. In an internal combustion engine, the combination with a plurality of cylinders having ports for intake and exhaust and pistons operative in the cylinders, of a rotary valve disposed lengthwise of the series of cylinders, a valve casing having a passage extending continuously in open communication with the face of the valve throughout the length thereof, and arranged to be traversed lengthwise of the valve by fresh fuel gases drawn therethrough by the pistons on their suction strokes.

3. In an internal combustion engine, the combination with a plurality of cylinders having ports for intake and exhaust and pistons operative in the cylinders, of a rotary valve disposed lengthwise of the series of cylinders, a valve casing provided with means for conducting fresh fuel gases in contact with the surface of the valve throughout the length thereof, and means for automatically supplying lubricant so as to be aspirated by the fresh gases supplied to said conducting means.

4. In an internal combustion engine, the combination with a plurality of cylinders each having a port serving for both intake and exhaust, and pistons operative in the cylinders, of a rotary valve extending lengthwise of the series of cylinders and having a longitudinal passage in its interior and external pockets arranged to connect said cylinder ports alternately with intake and exhaust, a valve casing embodying a longitudinal intake manifold chamber in continuous open communication with the side of the valve substantially throughout the length thereof, means of communication between said manifold chamber and the longitudinal passage in the valve, and means for supplying said manifold chamber and passage with fuel gases.

5. In an internal combustion engine, the combination with a plurality of cylinders having ports and pistons operative in the cylinders, of a rotary combined intake and exhaust valve extending lengthwise of the series of cylinders and having a longitudinal passage in its interior and external pockets, the latter adapted to connect the cylinder ports alternately with intake and exhaust; suitable means for supplying the valve with fuel gases, and an intake manifold adapted to be connected with the cylinder ports by said valve pockets and having fuel gas inlets at both ends and means of communication with said valve passage, whereby fuel gases pass lengthwise through the interior of the valve into the intake manifold.

6. In an internal combustion engine, the combination with a plurality of cylinders each having a port serving for both intake and exhaust, and pistons operative in the cylinders, of a rotary valve extending lengthwise of the series of cylinders and having a longitudinal passage in its interior and external pockets arranged to connect said cylinder ports alternately with intake and exhaust, suitable means for supplying said longitudinal valve passage with fuel gases at one end, a valve casing embodying an intake manifold connected at one end with the remote end of said valve passage, and an inlet to the other end of the manifold from the fuel supply means.

7. In an internal combustion engine having cylinders with ports, a valve casing extending longitudinally of the series of cylinders and having intake and exhaust passages, a rotary valve in said casing having a central bore and external pockets in the thickness of its walls for connecting said cylinder ports with said intake and exhaust passages at the proper times, means of communication between said bore and the intake passage or passages in the casing, and a source of supply of fuel gases connected with said bore and casing passage.

8. In an internal combustion engine having cylinders with ports, a valve casing extending lengthwise of the series of cylinders and having an intake manifold embodied in the casing and also provided with means of communication with an exhaust, a rotary valve in said casing having an internal longitudinal passage and external pockets, the latter adapted to connect the cylinder ports alternately with the intake and exhaust, a connection between said passage and the intake manifold, and a suitable source of fuel gases communicating with the connected valve passage and intake manifold, whereby fresh gases flow through the valve passage into the intake manifold and thence to the cylinders by way of said pockets.

9. In an internal combustion engine, the combination with a plurality of cylinders having ports and pistons operative in the cylinders, of an intake manifold, an exhaust, a rotary valve extending lengthwise of the series of cylinders and having a longitudinal internal passage and external pockets in its sides, the latter adapted to connect the cylinder ports alternately with the intake and exhaust, suitable means for supplying fresh gases to one end of the internal passage of the valve, and connection between the other end of said passage and the intake manifold.

10. In an internal combustion engine having cylinders provided with suitable ports, a rotary combined intake and exhaust valve having a longitudinal passage in its interior and external pockets in its sides, the latter being adapted to connect the cylinder ports alternately with intake and exhaust; in combination with an enlarged chamber surrounding a portion of said valve, which at this point is provided with openings through its walls, and means affording a longitudinal passage outside of the valve and in communication with said chamber, said pockets connecting said outside passage and the cylinder ports at the proper times, and suitable means for supplying fuel gases to said passages inside and outside of the valve, said valve having a projection extending beyond said chamber and provided with a driving connection.

11. An internal combustion engine having a series of cylinders each having a port serving for both intake and exhaust, a rotary valve extending lengthwise of the said series of cylinders and consisting of separate engaging sections having interengaging formations at their abutting ends, one section for each cylinder, said valve having a longitudinal passage for fuel gases in its interior, and suitable means surrounding the valve and affording intake and exhaust passages, the former being connected with said longitudinal passage in the valve, and the said sections of said valve having external lateral pockets which connect the cylinder ports with said intake and exhaust passages at the proper times.

12. In an internal combustion engine, the combination with the cylinders having pistons therein and ports serving both for intake and exhaust, of a valve casing having intake and exhaust spaces, a rotary valve having a longitudinal passage in its interior connected with a source of supply of fresh gases and also with the intake space of said casing, said valve also having lateral pockets for connecting said cylinder ports alternately with said intake and exhaust spaces, the valve being further provided on its surface with longitudinally-channeled areas, said channeled areas being restricted to portions of the circumference of the valve so disposed as to be opposite said cylinder ports when the pistons are on their compression strokes while during the explosion strokes the plain portions of the valve are opposite said ports.

13. In an internal combustion engine having a cylinder, piston and cylinder port, a valve casing and a rotary cylindrical valve therein controlling said port, said valve having a longitudinally channeled or ribbed area restricted to such portion of the valve as to be opposite the cylinder port when the piston is on its compression stroke while during the explosion stroke the plain surface of the valve is opposite the port.

14. In an internal combustion engine having a cylinder, a piston and a cylinder port, a rotary cylindrical valve controlling said port, and a casing for said valve having a longitudinal channel with a scraping edge opposite said port.

15. In an internal combustion engine having a cylinder, a piston and a cylinder port, a rotary cylindrical valve controlling said port, a casing for said valve having a longitudinal channel with a scraping edge opposite said port, and means whereby the piston on its suction stroke draws fresh gases through said channel.

16. In an internal combustion engine, the combination with a plurality of cylinders each having a common port for intake and exhaust, and pistons in said cylinders operative on a four stroke cycle, of a rotary valve disposed lengthwise of the series of cylinders and provided with lateral pockets arranged to connect the cylinder ports alternately with intake and exhaust at the proper times, and a valve casing having a passage connected with a source of fuel gases and arranged to conduct said gases lengthwise of the valve along and in contact with the surface thereof.

17. In an internal combustion engine comprising a plurality of cylinders each having a common port for intake and exhaust, a rotary valve extending lengthwise of the series of cylinders, a valve casing and longitudinal intake and exhaust manifolds outside of the rotary valve, said valve having a longitudinal internal passage and lateral pockets, the latter adapted to connect the cylinder ports alternately with the intake and exhaust manifolds, means of communication between said internal valve passage and the intake manifold, and a suitable source of supply of fuel gases connected with said passage and manifold, whereby fresh fuel gases flow lengthwise through the interior of the valve and thence into the intake manifold whence they are admitted by the valve pockets to the cylinders at the proper times.

In witness whereof I have signed my name in the presence of two subscribing witnesses.

EUGENE M. BOURNONVILLE.

Witnesses:
E. GREENBERGER,
M. M. BURNET.